(12) United States Patent
Maiberger et al.

(10) Patent No.: US 8,811,539 B2
(45) Date of Patent: Aug. 19, 2014

(54) DEMAPPER FOR ROTATED QAM CONSTELLATIONS

(75) Inventors: Roy Maiberger, Kiryat Ono (IL); Roy Oren, Magshimim (IL)

(73) Assignee: Siano Mobile Silicon Ltd., Kfar Netter (IL)

( * ) Notice: Subject to any disclaimer, the term of this patent is extended or adjusted under 35 U.S.C. 154(b) by 221 days.

(21) Appl. No.: 13/532,795

(22) Filed: Jun. 26, 2012

(65) Prior Publication Data

US 2013/0343489 A1 Dec. 26, 2013

(51) Int. Cl.
*H03K 9/10* (2006.01)

(52) U.S. Cl.
USPC ........... 375/323; 375/317; 375/343; 375/342; 375/340; 375/316

(58) Field of Classification Search
USPC ................ 375/323, 317, 343, 342, 340, 316
See application file for complete search history.

(56) References Cited

U.S. PATENT DOCUMENTS

| | | | |
|---|---|---|---|
| 2005/0141628 A1* | 6/2005 | Cheng | 375/261 |
| 2012/0093249 A1* | 4/2012 | Sun et al. | 375/265 |

OTHER PUBLICATIONS

Digital Video Broadcasting, "Implementation guidelines for a second generation digital terrestrial television broadcasting system (DVB-T2)", DVB Document A133, Feb. 2012.
Digital Video Broadcasting, "Frame structure channel coding and modulation for a second generation digital terrestrial television broadcasting system (DVB-T2)", DVB Document A122, Jul. 2011.
Li et al., "Design of Rotated QAM Mapper/Demapper for the DVB-T2 Standard", IEEE Workshop on Signal Processing Systems (SiPS), p. 18-23, Tampere, Finland, Oct. 7-9, 2009.

* cited by examiner

*Primary Examiner* — Zewdu Kassa
(74) *Attorney, Agent, or Firm* — D. Kligler I.P. Services Ltd.

(57) ABSTRACT

A method includes receiving a symbol modulated with multiple bits according to a signal constellation including multiple constellation points. A soft metric is computed for a given bit in the symbol: A first constellation point closest to the received symbol according to a distance measure is found. A row or column of the constellation points, which is closest to the first constellation point according to the distance measure, and over which a value of the given bit is constant and is opposite to the value of the given bit in the first constellation point, is identified. At least the identified row or column is searched for a second constellation point that is closest to the received symbol according to the distance measure. The soft metric is calculated based on the first and second constellation points. The value of the given bit is reconstructed based on the soft metric.

20 Claims, 4 Drawing Sheets

DEMAPPER FOR ROTATED QAM CONSTELLATIONS

FIELD OF THE INVENTION

The present invention relates generally to wireless communication, and particularly to methods and systems for receiving digitally-modulated signals.

BACKGROUND OF THE INVENTION

Some communication systems use modulation schemes having rotated symbol constellations. In a rotated constellation, the real and imaginary components of the constellation symbols are typically not parallel with the axes of the signal space, but rather rotated at a certain angle relative to the axes.

Rotated constellations are used, for example, in DVB-T2 digital video broadcasting systems specified in "Digital Video Broadcasting (DVB); Frame Structure Channel Coding and Modulation for a Second Generation Digital Terrestrial Television Broadcasting System (DVB-T2)," DVB Document A122, July 2011, which is incorporated herein by reference. Constellation rotation is addressed, for example, in section 6.3.

Implementation guidelines for implementing constellation rotation in DVB-T2 systems are given in "Digital Video Broadcasting (DVB); Implementation Guidelines for a Second Generation Digital Terrestrial Television Broadcasting System (DVB-T2)," DVB Document A133, February 2012, which is incorporated herein by reference.

Li et al., describe example mapper and demapper designs for modulation and demodulation using rotated constellations, in "Design of Rotated QAM Mapper/Demapper for the DVB-T2 Standard," IEEE Workshop on Signal Processing Systems (SiPS), Oct. 7-9, 2009, which is incorporated herein by reference.

SUMMARY OF THE INVENTION

An embodiment of the present invention that is described herein provides a method, which includes receiving a symbol that has been modulated with multiple bits in accordance with a signal constellation including multiple constellation points. A soft metric is computed for a given bit in the received symbol by: A first constellation point that is closest to the received symbol in accordance with a distance measure is found. A row or column of the constellation points that is closest to the first constellation point in accordance with the distance measure, and over which a value of the given bit is constant and is opposite to the value of the given bit in the first constellation point, is identified. At least the identified row or column is searched for a second constellation point that is closest to the received symbol in accordance with the distance measure. The soft metric is calculated based on the first and second constellation points. The value of the given bit in the received symbol is reconstructed based on the soft metric.

In some embodiments, searching for the second constellation point includes searching over the identified row or column and over an additional partial subset of the constellation points that is predefined for the first constellation point. In an embodiment, searching for the second constellation point includes accessing a Look-Up Table (LUT), which specifies a respective partial subset of the constellation points for each constellation point, so as to select the additional partial subset of the constellation points.

In a disclosed embodiment, the signal constellation includes rows and columns of the constellation that are not parallel to respective signal space axes. In another embodiment, calculating the soft metric includes calculating a difference or a ratio between respective distances of the first and second constellation points from the received symbol. In yet another embodiment, calculating the soft metric includes conditionally inverting the soft metric based on a sign of the given bit in the first constellation point.

In still another embodiment, searching for the second constellation point includes deciding whether to search only over the identified row or column, or over the identified row or column and an additional predefined subset of the constellation points, based on a Signal to Noise Ratio (SNR) estimate. In an embodiment, the distance measure includes a Max-Log approximation of a Maximum Likelihood (ML) estimate.

There is additionally provided, in accordance with an embodiment of the present invention, apparatus including a front-end receiver and a baseband processor. The front-end receiver is configured to receive a symbol that has been modulated with multiple bits in accordance with a signal constellation including multiple constellation points. The baseband processor is configured, for a given bit in the received symbol, to find a first constellation point that is closest to the received symbol in accordance with a distance measure, to identify a row or column of the constellation points that is closest to the first constellation point in accordance with the distance measure, and over which a value of the given bit is constant and is opposite to the value of the given bit in the first constellation point, to search over at least the identified row or column for a second constellation point that is closest to the received symbol in accordance with the distance measure, to compute the soft metric based on the first and second constellation points, and to reconstruct the value of the given bit in the received symbol based on the soft metric.

There is also provided, in accordance with an embodiment of the present invention, a method including receiving a symbol that has been modulated with multiple bits in accordance with a signal constellation including multiple constellation points. A soft metric is computed for a given bit in the received symbol by: finding a first constellation point that is closest to the received symbol in accordance with a distance measure; storing a first distance between the first constellation and the received symbol to serve as a term of the soft metric; finding a second constellation point for which a value of the given bit is opposite from the value of the given bit in the first constellation point; storing a second distance between the second constellation and the received symbol to serve as an opposite term of the soft metric; and conditionally inverting the soft metric based on a sign of the given bit in the first constellation point. The value of the given bit in the received symbol is reconstructed based on the soft metric.

There is further provided, in accordance with an embodiment of the present invention, apparatus including a front-end receiver and a baseband processor. The front-end receiver is configured to receive a symbol that has been modulated with multiple bits in accordance with a signal constellation including multiple constellation points. The baseband processor is configured, for a given bit in the received symbol, to find a first constellation point that is closest to the received symbol in accordance with a distance measure, to store a first distance between the first constellation and the received symbol to serve as a term of a soft metric for the given bit, to find a second constellation point for which a value of the given bit is opposite from the value of the given bit in the first constellation point, to store a second distance between the second constellation and the received symbol to serve as an opposite term of the soft metric, to conditionally invert the soft metric based on a sign of the given bit in the first constellation point, and to reconstruct the value of the given bit in the received symbol based on the soft metric.

There is also provided, in accordance with an embodiment of the present invention, a method including receiving a multi-bit symbol that has been modulated with multiple bits in accordance with a signal constellation including multiple constellation points. A first constellation point, having a minimal distance to the received symbol in accordance with a distance measure, is identified. Multiple soft metrics are computed for the respective multiple bits of the received symbol based on the minimal distance of the first constellation point, without re-identifying the first constellation point or re-calculating the minimal distance for each soft metric. The multiple bits of the received symbol are decoded based on the soft metrics.

There is additionally provided, in accordance with an embodiment of the present invention, apparatus including a front-end receiver and a baseband processor. The front-end receiver is configured to receive a multi-bit symbol that has been modulated with multiple bits in accordance with a signal constellation including multiple constellation points. The baseband processor is configured to identify a first constellation point having a minimal distance to the received symbol in accordance with a distance measure, to compute multiple soft metrics for the respective multiple bits of the received symbol based on the minimal distance of the first constellation point, without re-identifying the first constellation point or re-calculating the minimal distance for each soft metric, and to decode the multiple bits of the received symbol based on the soft metrics.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for demodulating signals that have been modulated using multi-bit constellations. In particular, the disclosed techniques are highly efficient in demodulating rotated constellations of the kind used in DVB-T2 systems.

In some embodiments, a receiver receives a symbol that has been modulated with multiple bits in accordance with a multi-bit signal constellation. The constellation comprises multiple constellation points, each representing a respective combination of bit values. Typically, the mapping of bit values to constellation points uses Gray mapping. A baseband processor in the receiver computes a respective soft metric (e.g., Log-Likelihood Ratio—LLR) for each bit in the received symbol, and reconstructs the data in a soft decoding process based on the soft metrics.

The baseband processor computes the soft metric for a given bit in the received symbol by first finding the constellation point that is closest to the received symbol in accordance with a certain distance measure (e.g., Max-Log maximum likelihood approximation). This constellation point is referred to as the Argmin point.

Then, the baseband processor identifies a row or column of constellation points that is nearest to the received symbol, and for which the given bit is constant and is opposite relative to the given bit in the Argmin point. The baseband processor calculates a Maximum-Likelihood (ML) argument over the identified row or column (referred to as "front"), and possibly over an additional predefined subset of the constellation points.

The difference or ratio between this minimal ML argument and the ML argument of the Argmin point is used to form the soft metric. In some embodiments, the baseband conditionally inverts the soft metric depending on the value of the given bit in the Argmin point.

The soft metric computation process described herein searches over only a small number of constellation points— The nearest front and possibly a predefined subset of additional constellation points. In an example that is described herein, the search in a 256-QAM constellation is reduced to only twenty out of the 256 constellation points. As such, the disclosed process is highly efficient in terms of computational complexity and latency. The partial subsets of additional constellation points are typically defined so as to minimize degradation in demodulation performance, and at the same time reduce the number of searched constellation points.

System Description

Figure 1:
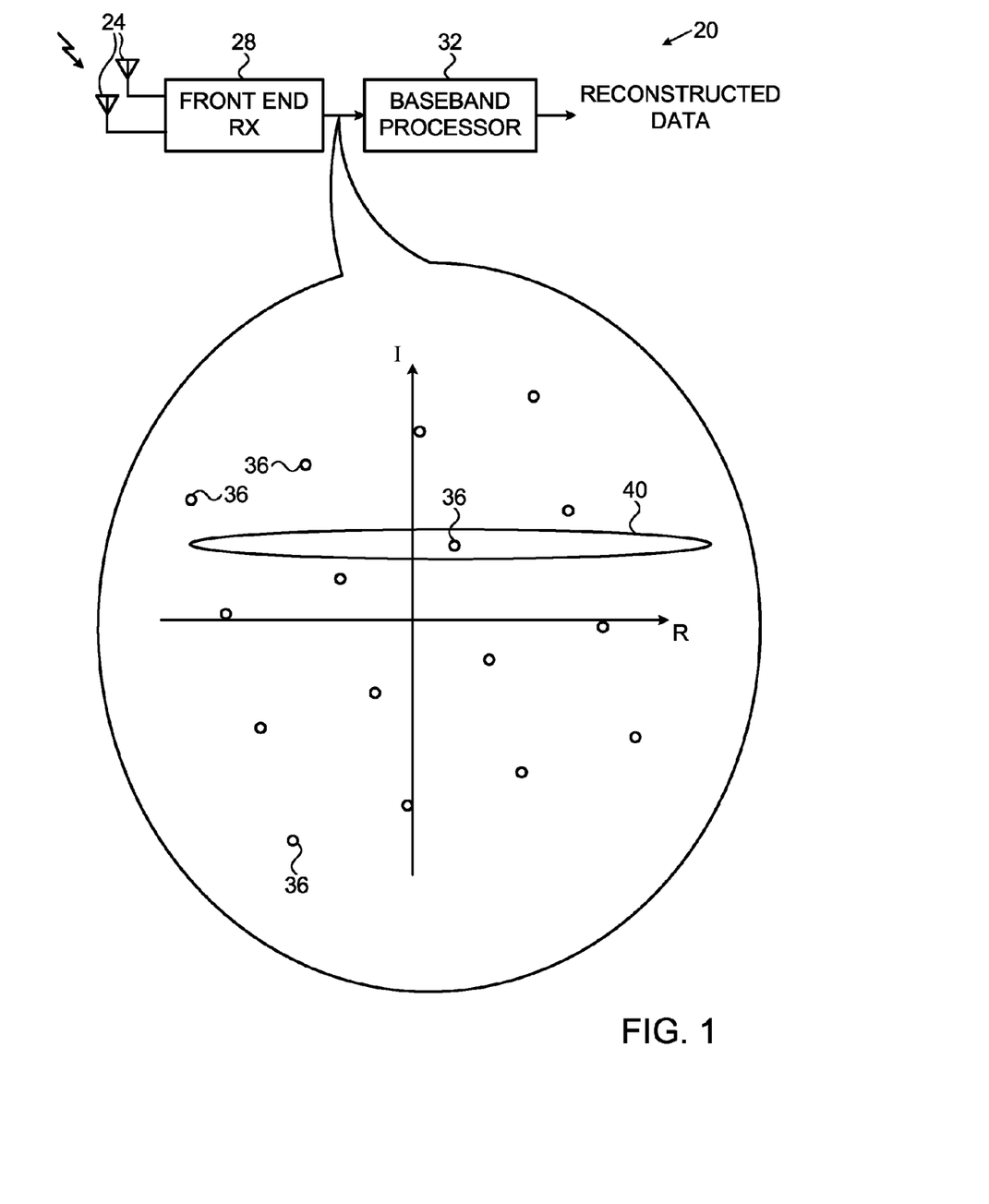
FIG. 1 is a block diagram that schematically illustrates a receiver for receiving signals modulated using a rotated constellation, in accordance with an embodiment of the present invention.

FIG. 1 is a block diagram that schematically illustrates a receiver 20 for receiving signals modulated using a rotated constellation, in accordance with an embodiment of the present invention. In the present example, receiver 20 receives terrestrial video transmissions in accordance with the DVB-T2 specification, cited above. In alternative embodiments, however, the techniques described herein can be used with any other suitable communication protocol.

Receiver 20 comprises one or more antennas 24, a front-end receiver 28 and a baseband processor 32. Receiver 28 receives Radio Frequency (RF) signals that carry data from a transmitter (not shown) via antennas 24. The front-end receiver down-converts the RF signals to baseband, applies appropriate filtering and amplification, and digitizes the signals to produce a digital baseband signal that is provided to baseband processor 32.

Baseband processor 32 processes the digital baseband signals so as to reconstruct the data. The baseband processor may perform functions such as synchronization, digital filtering, channel equalization, gain control, demodulation, Error Correction Code (ECC) decoding and/or any other suitable function. In particular, baseband processor 32 applies a demapping scheme that is described in detail below.

Efficient LLR Estimation Process

The signal that is received by receiver 20 and processed by baseband processor 32 has been modulated in the transmitter using a certain signal constellation. In other words, the received signal comprises a sequence of symbols, each selected from a predefined constellation. Each constellation symbol corresponds to a respective data value including one or more bits.

In the example of FIG. 1, the constellation comprises sixteen Quadrature Amplitude Modulation (QAM) constellation symbols. Thus, each symbol in the sequence carries four bits of data, i.e., each constellation symbol represents a respective combination of four bit values. The example constellation is shown at the bottom of FIG. 1. The constellation is represented as a set of sixteen signal points 36 in a two-dimensional real (R) and imaginary (I) signal space.

The constellation symbols in FIG. 1 are arranged in rows and columns. According to the DVB-T2 specifications, however, the rows and columns are not parallel with the real and imaginary axes of the signal space, but rather rotated by the transmitter at a certain oblique angle. Moreover, the signal received by receiver 20 is an Orthogonal Frequency Division Multiplexing (OFDM) signal, which comprises multiple carriers transmitted on respective frequencies. The real and image components of a given transmission are transmitted on different carriers of the OFDM signal. Elements of the transmitter and receiver that carry out these functions, such as interleaver, de-interleaver, Fast Fourier Transform (FFT) and Inverse FFT (IFFT) modules, are omitted from the figure for the sake of clarity.

Constellation rotation and transmission of the real and imaginary components on different carriers are used for mitigating frequency-selective fading: When using this sort of modulation, even if one of the components suffers from poor Signal to Noise Ratio (SNR), it is often possible to reconstruct the data from the other component alone.

The example at the bottom of FIG. 1 illustrates a scenario in which the carrier that carries the imaginary (I) component of the signal has good SNR, but the carrier that carries the real (R) component of the signal has poor SNR. The noise distribution for one of the signal points is illustrated by an ellipse 40.

In this example, the noise variance is small along the I (vertical) axis and high along the R (horizontal) axis. Nevertheless, because of the constellation rotation, even if the real axis is erased and unusable, it is still possible to reconstruct the data from the projection of the signal on the imaginary axis.

Typically, baseband processor 32 demodulates the received signal by computing a soft metric for each bit in each received symbol, and then reconstructs the data using a soft decoding process from the soft metrics. In the description that follows the metrics comprise Log-Likelihood Ratios (LLRs) of the bits, but any other suitable type of soft metrics can be used in alternative embodiments.

The disclosed technique is based on several observations: When a QAM constellation is defined using Gray coding, as in the DVB-T2 specifications, any given bit will have a constant value (i.e., constantly "0" or constantly "1") along rows or columns of the constellation. In Gray-coded 256-QAM, for example, the even bits are constant along each column of the constellation, and the odd bits are constant along each row of the constellation. A (rotated or non-rotated) row or column of a constellation in which a given bit value is constant is referred to herein as a front for this bit. Fronts may be vertical (constellation columns) or horizontal (constellation rows).

A second observation is that when the real and imaginary axes of the constellation differ considerably in SNR, the constellation point that is nearest to the received signal (in terms of Euclidean distance) is not necessarily the constellation point that was most likely transmitted. In the scenario of FIG. 1, for example, the noise distribution of ellipse 40 means that the most likely constellation point may lie further away from the received signal point.

In some embodiments, baseband processor 32 carries out an efficient demapping process that takes the above observations into account. The disclosed demapping process is highly efficient in terms of computational power and latency, with little or no degradation in demodulation performance.

Typically, in order to calculate the LLR of a given bit in a received symbol, processor 32 first finds the nearest constellation point to the received in terms of ML argument. This constellation point is referred to as the Argmin point. The ML argument of the received symbol relative to the Argmin point serves as either the numerator or the denominator of the Likelihood Ratio (LR), or, equivalently, as one of the terms of the Log-Likelihood Ratio (LLR) that are subtracted from one another.

The processor then searches over the nearest front to the Argmin point in which the given bit has the opposite bit value, plus over a subset of additional constellation points that is predefined per each Argmin point. The smallest ML argument among the searched constellation points (nearest front plus predefined subset of additional constellation points) is used as the opposite term of the LLR. The respective subset of additional constellation points for each Argmin point is typically stored in a Look-Up Table (LUT), and the processor queries the LUT with the relevant Argmin point in order to determine the subset.

In the embodiments described herein, the signal-space measures between the received symbol and the various constellation points are approximated using the well-known Max-Log approximation of the Maximum-Likelihood (ML) estimate. In alternative embodiments, however, the disclosed techniques may be implemented using any other suitable distance measure.

Figure 2:
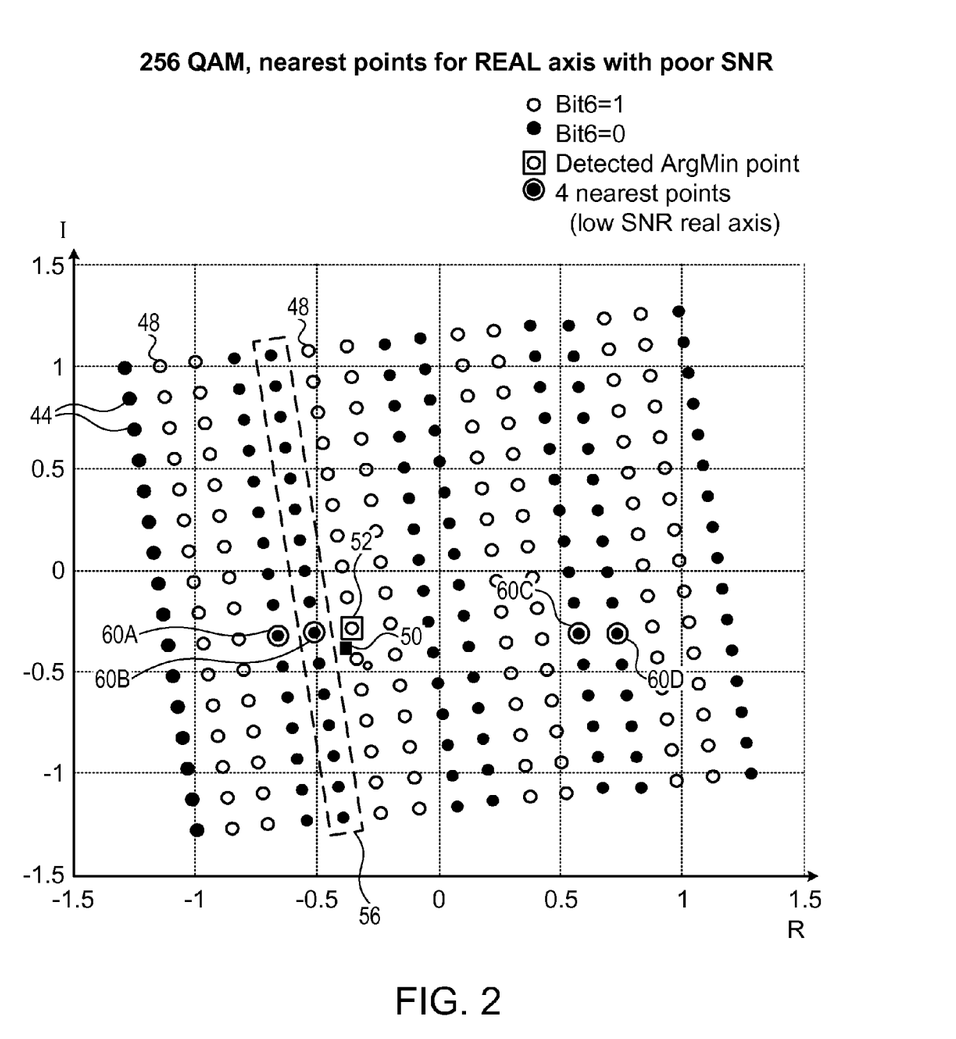
FIG. 2 is a signal diagram that schematically illustrates a process of demapping a signal modulated using a rotated constellation, in accordance with an embodiment of the present invention.

FIG. 2 is a signal diagram that schematically illustrates a process of demapping a signal modulated using a rotated constellation, in accordance with an embodiment of the present invention. The example of FIG. 2 refers to a rotated 256-QAM Gray-coded constellation, as defined in the DVB-T2 specifications. The example shows the process of computing an LLR for the $6^{th}$ bit of a received 256-QAM symbol. The disclosed technique, however, can be used for computing LLRs for any other bit in the constellation, for computing LLRs in various other constellations, and for computing various other kinds of soft metrics.

As noted above, for the $6^{th}$ bit of Gray-coded 256-QAM, the bit value is constant along each column of the constellation. Constellation points 44 for which the $6^{th}$ bit is "0" are marked in FIG. 2 using full bullets, and constellation points 48 for which the $6^{th}$ bit is "1" are marked in the figure using empty bullets. An example front 56, along which the $6^{th}$ bit value is constant, is marked with a dashed frame.

Figure 3:
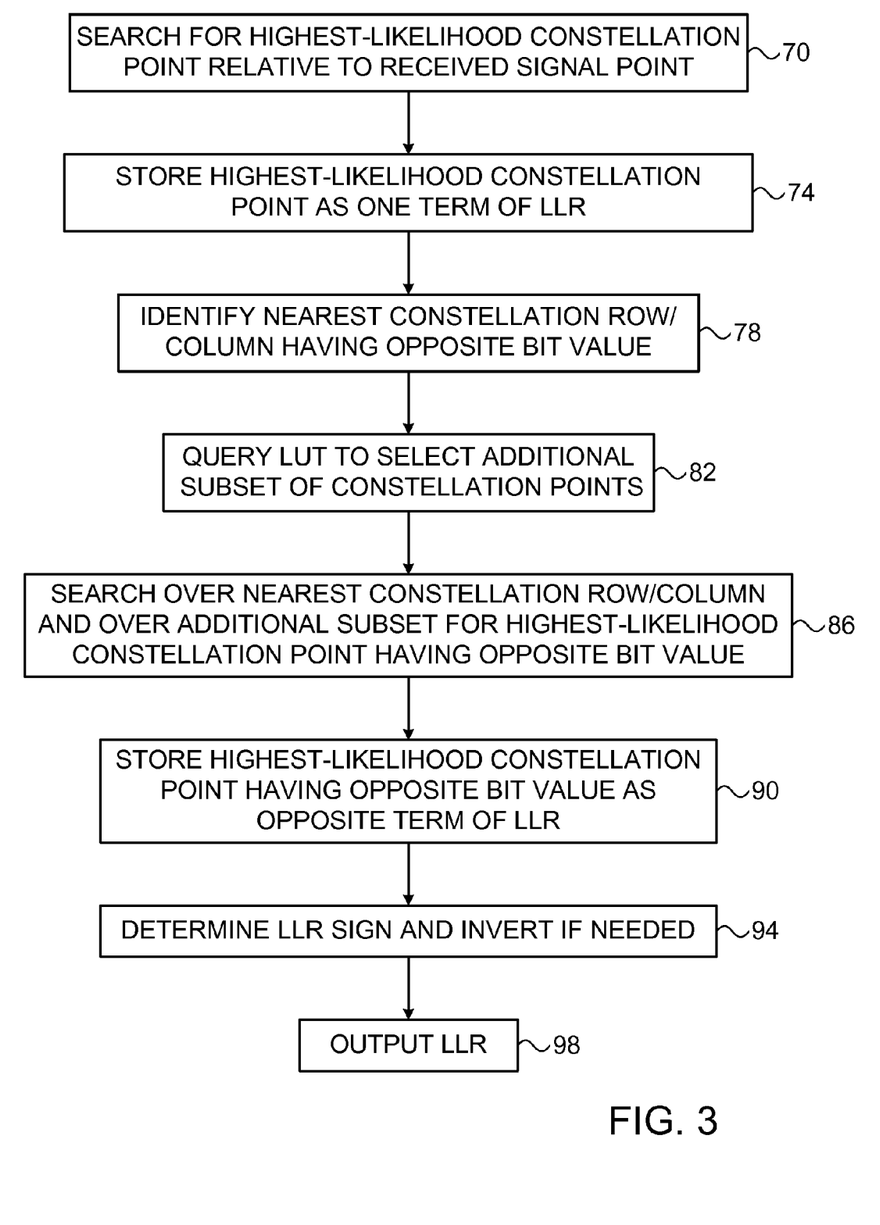
FIG. 3 is a flow chart that schematically illustrates a method for demapping a signal modulated using a rotated constellation, in accordance with an embodiment of the present invention.

FIG. 3 is a flow chart that schematically illustrates the process of computing an LLR for the $6^{th}$ bit of a received symbol, in accordance with an embodiment of the present invention. Reference will be made to FIGS. 2 and 3 together for ease of explanation.

The received symbol is shown in FIG. 2 as a signal point 50. The process of FIG. 3 begins with baseband processor 32 searching over the 256 constellation symbols of FIG. 2 for the constellation point that is most likely to have been transmitted assuming Gaussian noise distribution, at an initial search step 70. In other words, processor 32 searches for the constellation point having the smallest ML Argument (Argmin) out of the 256 possible constellation points. In the present example, the nearest constellation point is marked 52.

In some embodiments, processor 32 searches for the nearest constellation point using the Max-Log approximation. In these embodiments, the nearest constellation point is given by:

$$S_{ArgMin} = \text{ArgMin}_{x \in S}[(\rho_I(I_{eq} - I_x))^2 + (\rho_Q(Q_{eq} - Q_x))^2] \quad [1]$$

wherein S denotes the searched constellation, x runs over the various constellation points, $I_{eq}$ and $Q_{eq}$ denote the real (in-phase) and imaginary (quadrature) coordinates of the equalized received symbol, $I_x$ and $Q_x$ denote the real and imaginary coordinates of constellation point x, and $\rho_I$ and $\rho_Q$ denote respective amplitude fading factors for the I and Q signal components. The nearest point $S_{ArgMin}$ (point 52) is referred to herein as the Argmin point.

The Max-Log result of Argmin point 52 (the result of $(\rho_I(I_{eq}-I_x))^2+(\rho_Q(Q_{eq}-Q_x))^2$ in Equation [1]) will serve as one of the terms of the computed LLR, depending on the value of the $6^{th}$ bit in Argmin point 52. Therefore, processor 32 stores this value for later use, at a first storage step 74.

Processor 32 then identifies the front that is nearest to Argmin point 52 and has the opposite value of the $6^{th}$ bit relative to the Argmin point, at a front identification step 78. In the example of FIG. 2, the nearest front having the opposite bit value is front 56. In some embodiments, the baseband processor holds a table that specifies the constellation points belonging to each vertical and horizontal front. When receiver 20 supports more than one constellation (e.g., 64-QAM and 256-QAM), multiple tables can be used.

Processor 32 queries the LUT with the Argmin point, in order to select a subset of additional constellation points, at a subset selection step 82. For a given Argmin point and bit value, the LUT lists the additional constellation points (in addition to the nearest front identified at step 78) that possibly include the constellation point having the opposite bit value and the smallest ML argument relative to the received symbol. The LUT typically comprises three or four additional constellation points from one or more additional fronts (e.g., three fronts) in addition to the nearest front.

In alternative embodiments, the size of the LUT can be set to hold a larger or smaller number of constellation points, as desired. The LUT size is typically a trade-off between demodulation performance on one side, and hardware size and computational complexity (search over a larger number of constellation points) on the other.

In the example of FIG. 2, the additional subset stored in the LUT for Argmin point 52 comprises the four constellation points marked in the FIG. 60A . . . 60D. Note that point 60B is already part of the nearest front 56, so practically there are three additional constellation points.

Processor 32 searches over the nearest front of constellation points (identified at step 78) and over the additional subset of constellation points (selected at step 82) for the constellation point having the smallest ML argument, at a searching step 86. When using the Max-Log approximation, the resulting constellation point is given by:

$$S_{front+subset} = \text{ArgMin}_{x \in front+subset}\begin{bmatrix}(\rho_I(I_{eq} - I_x))^2 + \\ (\rho_Q(Q_{eq} - Q_x))^2\end{bmatrix} \quad [2]$$

wherein this time x runs over the constellation points in the nearest front identified at step 78 and the additional subset selected at step 82.

Processor 32 stores the Max-Log result of the search result (the result of $(\rho_I(I_{eq}-I_x))^2+(\rho_Q(Q_{eq}-Q_x))^2$ in Equation [2]) to serve as the opposite term of the computed LLR (opposite from the term stored at step 74 above), at a second storage step 90. The LLR of the $i^{th}$ bit is thus given by:

$$LLR(b_i)=(S_{front+subset}-S_{ArgMin})\cdot\text{sign}(b_i) \quad [3]$$

wherein $\text{sign}(b_i)$ denotes the bit value of the $i^{th}$ bit as detected in the Argmin point such that $\text{sign}(\text{``0''})=1$ and $\text{sign}(\text{``1''})=-1$. (In the present example, the soft metric comprises a logarithmic likelihood measure, and is therefore computed as a difference between $S_{front+subset}$, $S_{ArgMin}$. Alternatively, e.g., when using linear likelihood measures, the soft metric may be computed as a ratio between $S_{front+subset}$ and $S_{ArgMin}$.)

Processor 32 selects the sign of the LLR (i.e., conditionally inverts the LLR) based on the sign of the $6^{th}$ bit as detected in the Argmin point, and inverts the LLR if needed, at a sign setting step 94. The processor then outputs the computed LLR, at an output step 98. The process is typically repeated in a similar manner for all the bits of the received symbol.

When receiving a sequence of QAM symbols, the baseband processor typically reconstructs the data based on the LLRs of the various bits of the various symbols in the sequence. The baseband processor typically applies a soft decoding process, such as Maximum Likelihood Sequence Estimation (MLSE), to the computed LLRs.

The flow chart of FIG. 3 illustrates an example flow of steps that is chosen purely for the sake of conceptual clarity. In alternative embodiments, various other possible flows may be performed, in order to reduce the number of computations or for any other reason. For example, when computing the 256 ML arguments of the constellation points from the received symbol at step 70, processor 32 may record the minimal ML argument over each vertical and horizontal front. These thirty-two values may be stored for use in step 86. When executing step 86 in this embodiment, the processor does not need to search for the constellation point having the smallest Argmin within the nearest front, because it is already known.

As noted above, the LUT in baseband processor 32 specifies, for each constellation point and bit value, a respective subset of additional constellation points to be searched in addition to the nearest front. The subsets in the LUT are typically computed and preloaded in advance, e.g., using computerized simulation. The simulation may consider various trade-offs when setting the subset size.

For example, including more points in the subset will typically improve the demodulation performance but increase latency and computational load, and vice versa. The subset of additional constellation points may span any desired number of nearest fronts to the Argmin point, e.g., three fronts.

In some embodiments, receiver 20 may choose the constellation from among multiple possible constellations, e.g., Quadrature Phase Shift Keying (QPSK), 16-QAM, 64-QAM, 128-QAM and 256-QAM. In some embodiments, processor 32 carries out the disclosed technique only for a subset of high-order constellations (e.g., only for 64-QAM, 128-QAM and 256-QAM but not for 16-QAM). The remaining constellation or constellations are demapped by searching over the entire constellation, typically using the Max-Log approximation.

In some embodiments, baseband processor 32 selects whether to search over the additional subset of constellation points depending on SNR. When the SNR is sufficiently high, e.g., above a predefined threshold, processor 32 may skip step 82, and at step 86 search only over the nearest front.

Example Demapper Implementation

Figure 4:
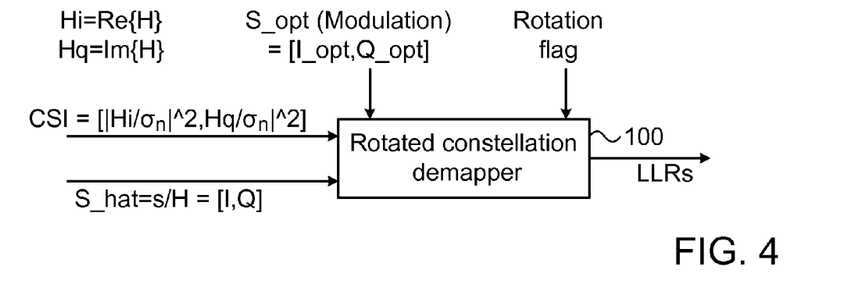
FIG. 4 is a block diagram that schematically illustrates a rotated constellation demapper, in accordance with an embodiment of the present invention.

FIG. 4 is a block diagram that schematically illustrates a rotated constellation demapper 100, in accordance with an embodiment of the present invention. Demapper 100 may be used to carry out the LLR computation method of FIG. 3 above. In the terminology of FIG. 4, H denotes the complex channel matrix between the transmitter and receiver 20, $H_i$ and $H_q$ respectively denote the I and Q components of H, $\sigma_n$ denotes the noise variance in the received signal, CSI denotes a SNR vector of the SNRs of the I and Q signal components, S_opt denotes the transmitted constellation points, s denotes the received signal, S_hat denotes the equalized signal, and Rotation flag denotes a flag indicating whether constellation rotation was used in the transmitter or not.

Figure 5:
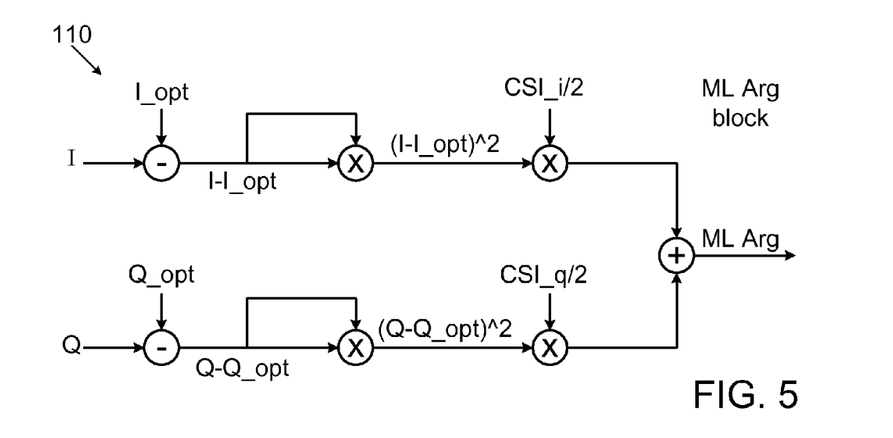
FIG. 5 is a block diagram that schematically illustrates a module for finding a maximum-likelihood argument, in accordance with an embodiment of the present invention.

FIG. 5 is a block diagram that schematically illustrates a module 110 for calculating the ML argument, in accordance with an embodiment of the present invention. This module is also referred to as a ML Arg module. Module 110 accepts as input the I_opt and Q_opt values of a given constellation point (denoted I_opt and Q_opt on the left-hand-side of the figure), as well as the I and Q coordinates of the received symbol (denoted I and Q), and outputs the Max-Log approximation of the ML argument between the received point and a transmitted constellation point. In other words, module 110 evaluates Equation [1] above.

Figure 6:
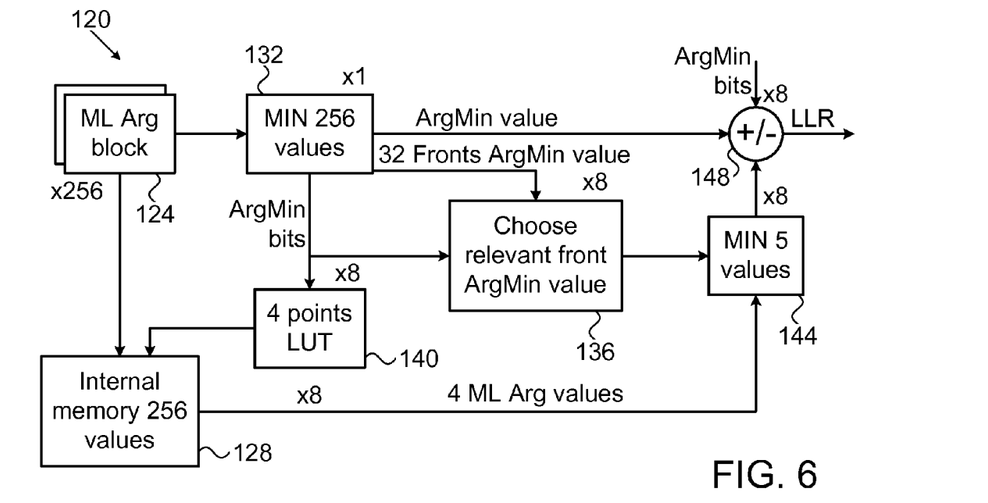
FIG. 6 is a block diagram that schematically illustrates a rotated constellation demapper, in accordance with an embodiment of the present invention.

FIG. 6 is a block diagram that schematically illustrates a rotated constellation demapper 120, in accordance with an embodiment of the present invention. Demapper 120 can be used for carrying out the LLR computation method of FIG. 3 above. Demapper 120 comprises multiple modules that may be implemented using hardware or software. The number of computations carried out by each module when demapping the 256-QAM constellation of FIG. 2 is shown next to the module in the figure.

Demapper 120 comprises one or more ML Arg modules 124, which may be implemented, for example, using the configuration of module 110 of FIG. 5. Modules 124 calculate the 256 ML arguments for the 256 constellation points.

An internal memory 128 stores the 256 ML arguments calculated by modules 124. A minimization module 132 finds the minimum among the 256 ML arguments, i.e., the ML argument between the received symbol and the nearest constellation point. This minimum ML argument is stored for use as one of the terms of the LLR.

When looking for the minimum ML argument, module 132 records the minimum ML argument over each of the thirty two (vertical and horizontal) fronts of the constellation, as described above. A front selection module 136 selects the nearest front based on the outputs of module 132 (i.e., the bits of the Argmin point).

The identity of the nearest constellation point (output by module 132) is used as a key to access a LUT 140, which specifies a subset of additional constellation points to be searched in addition to the nearest front.

The calculated ML arguments of the constellation points of the nearest front are provided by module 136 to a minimization module 144. Module 144 is also provided with the ML arguments of the constellation points of the additional subset, which are extracted from internal memory 128.

Module 144 finds the constellation point having the minimum ML argument over the nearest front and the additional subset. The ML argument of this constellation point is used as the opposite term of the LLR. As inversion module 148 conditionally inverts the LLR depending on the bit value of the Argmin point. The resulting LLR is provided as output.

The receiver configuration shown in FIG. 1, and the configurations of demappers 100 and 120 and module 110 shown in FIGS. 4-6, are example configurations that are chosen purely for the sake of conceptual clarity. In alternative embodiments, any other suitable configurations can be used. Certain elements of receiver 20, including the configurations shown in FIGS. 4-6, may be implemented using hardware, such as using one or more Radio Frequency Integrated Circuits (RFICs), Application-Specific Integrated Circuits (ASICs) or Field-Programmable Gate Arrays (FPGAs). Alternatively, some receiver elements may be implemented in software or using a combination of hardware and software elements.

In some embodiments, certain functions of baseband processor 32 (including functions illustrated in FIGS. 4-6) may be implemented using a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving a symbol that has been modulated with multiple bits in accordance with a signal constellation comprising multiple constellation points;
computing a soft metric for a given bit in the received symbol by:
finding a first constellation point that is closest to the received symbol in accordance with a distance measure;
identifying a row or column of the constellation points that is closest to the first constellation point in accordance with the distance measure, and over which a value of the given bit is constant and is opposite to the value of the given bit in the first constellation point;
searching over at least the identified row or column for a second constellation point that is closest to the received symbol in accordance with the distance measure; and
calculating the soft metric based on the first and second constellation points; and reconstructing the value of the given bit in the received symbol based on the soft metric.

2. The method according to claim 1, wherein searching for the second constellation point comprises searching over the identified row or column and over an additional partial subset of the constellation points that is predefined for the first constellation point.

3. The method according to claim 2, wherein searching for the second constellation point comprises accessing a Look-Up Table (LUT), which specifies a respective partial subset of the constellation points for each constellation point, so as to select the additional partial subset of the constellation points.

4. The method according to claim 1, wherein the signal constellation comprises rows and columns of the constellation that are not parallel to respective signal space axes.

5. The method according to claim 1, wherein calculating the soft metric comprises calculating a difference or a ratio between respective distances of the first and second constellation points from the received symbol.

6. The method according to claim 1, wherein calculating the soft metric comprises conditionally inverting the soft metric based on a sign of the given bit in the first constellation point.

7. The method according to claim 1, wherein searching for the second constellation point comprises deciding whether to search only over the identified row or column, or over the identified row or column and an additional predefined subset of the constellation points, based on a Signal to Noise Ratio (SNR) estimate.

8. The method according to claim 1, wherein the distance measure comprises a Max-Log approximation of a Maximum Likelihood (ML) estimate.

9. Apparatus, comprising:
a front-end receiver, which is configured to receive a symbol that has been modulated with multiple bits in accordance with a signal constellation comprising multiple constellation points; and
a baseband processor, which is configured, for a given bit in the received symbol, to find a first constellation point that is closest to the received symbol in accordance with a distance measure, to identify a row or column of the constellation points that is closest to the first constellation point in accordance with the distance measure, and over which a value of the given bit is constant and is opposite to the value of the given bit in the first constellation point, to search over at least the identified row or column for a second constellation point that is closest to the received symbol in accordance with the distance measure, to compute the soft metric based on the first and second constellation points, and to reconstruct the value of the given bit in the received symbol based on the soft metric.

10. The apparatus according to claim 9, wherein the baseband processor is configured to search for the second constellation point over the identified row or column and over an additional partial subset of the constellation points that is predefined for the first constellation point.

11. The apparatus according to claim 10, and comprising a Look-Up Table (LUT) that specifies a respective partial subset of the constellation points for each constellation point, wherein the baseband processor is configured to access the LUT so as to select the additional partial subset of the constellation points.

12. The apparatus according to claim 9, wherein the signal constellation comprises rows and columns of the constellation that are not parallel to respective signal space axes.

13. The apparatus according to claim 9, wherein the baseband processor is configured to compute the soft metric by calculating a difference or a ratio between respective distances of the first and second constellation points from the received symbol.

14. The apparatus according to claim 9, wherein the baseband processor is configured to conditionally invert the soft metric based on a sign of the given bit in the first constellation point.

15. The apparatus according to claim 9, wherein the baseband processor is configured to decide whether to search only over the identified row or column, or over the identified row or column and an additional predefined subset of the constellation points, based on a Signal to Noise Ratio (SNR) estimate.

16. The apparatus according to claim 9, wherein the distance measure comprises a Max-Log approximation of a Maximum Likelihood (ML) estimate.

17. A method, comprising:
receiving a symbol that has been modulated with multiple bits in accordance with a signal constellation comprising multiple constellation points;
computing a soft metric for a given bit in the received symbol by:
finding a first constellation point that is closest to the received symbol in accordance with a distance measure;
storing a first distance between the first constellation and the received symbol to serve as a term of the soft metric;
finding a second constellation point for which a value of the given bit is opposite from the value of the given bit in the first constellation point;
storing a second distance between the second constellation and the received symbol to serve as an opposite term of the soft metric; and
conditionally inverting the soft metric based on a sign of the given bit in the first constellation point; and
reconstructing the value of the given bit in the received symbol based on the soft metric.

18. The method according to claim 17, wherein finding the second constellation point comprises searching over at least a row or column of the constellation points that is closest to the first constellation point in accordance with the distance measure.

19. Apparatus, comprising:
a front-end receiver, which is configured to receive a symbol that has been modulated with multiple bits in accordance with a signal constellation comprising multiple constellation points; and
a baseband processor, which is configured, for a given bit in the received symbol, to find a first constellation point that is closest to the received symbol in accordance with a distance measure, to store a first distance between the first constellation and the received symbol to serve as a term of a soft metric for the given bit, to find a second constellation point for which a value of the given bit is opposite from the value of the given bit in the first constellation point, to store a second distance between the second constellation and the received symbol to serve as an opposite term of the soft metric, to conditionally invert the soft metric based on a sign of the given bit in the first constellation point, and to reconstruct the value of the given bit in the received symbol based on the soft metric.

20. The apparatus according to claim 19, wherein the baseband processor is configured to finding the second constellation point by searching over at least a row or column of the constellation points that is closest to the first constellation point in accordance with the distance measure.

\* \* \* \* \*